United States Patent
Nikolov

(10) Patent No.: US 6,604,289 B2
(45) Date of Patent: Aug. 12, 2003

(54) UNIVERSAL MEASURING SCRIBER

(76) Inventor: Rusi I. Nikolov, 21901 Chase St., Canoga Park, CA (US) 91304

( * ) Notice: Subject to any disclaimer, the term of this patent is extended or adjusted under 35 U.S.C. 154(b) by 0 days.

(21) Appl. No.: 10/051,258

(22) Filed: Jan. 18, 2002

(65) Prior Publication Data

US 2002/0056200 A1 May 16, 2002

Related U.S. Application Data

(63) Continuation-in-part of application No. 09/430,884, filed on Nov. 1, 1999, now abandoned.

(51) Int. Cl.[7] .................................................. B43L 9/04
(52) U.S. Cl. ...................... 33/27.032; 33/42; 33/27.03
(58) Field of Search ....................... 33/41, 42, 783, 33/784, 810, 811, 812, 709, 795, 512, 794, 796, 802, 18.1, 19.2, 19.3, 21.1, 21.2, 27.01, 32.1, 32.2, 32.3, 41.1, 41.4–41.6, 44, 666, 669, 670, 27.032, 27.02, 27.03, 27.031, 27.033

(56) References Cited

U.S. PATENT DOCUMENTS

| | | | | |
|---|---|---|---|---|
| 70,937 A | * | 11/1867 | Ames | 33/42 |
| 230,127 A | * | 7/1880 | Goodwin | 33/44 |
| 266,646 A | * | 10/1882 | Rossman | 33/42 |
| 1,145,852 A | * | 7/1915 | Schramm | 33/811 |
| 1,753,191 A | * | 4/1930 | Armstrong | 33/42 |
| 2,347,625 A | * | 5/1944 | Burch | 33/42 |
| 2,349,567 A | * | 5/1944 | Townsend, Jr. et al. | 33/666 |
| 2,675,617 A | * | 4/1954 | Goldmand et al. | 33/42 |
| 2,898,682 A | * | 8/1959 | Lynch | 33/42 |
| 3,744,136 A | * | 7/1973 | Henke | 33/709 |
| 3,805,391 A | | 4/1974 | Glasgow | 33/41 |
| 3,835,544 A | * | 9/1974 | Schneider | 33/795 |
| 3,871,100 A | | 3/1975 | Hildebrandt | 33/42 |
| 4,201,226 A | * | 5/1980 | Phillips | 33/512 |
| 4,229,883 A | * | 10/1980 | Kobashi | 33/784 |
| 4,291,465 A | * | 9/1981 | Hemeyer | 33/795 |
| 4,399,613 A | * | 8/1983 | Nishikata et al. | 33/784 |
| 4,485,556 A | * | 12/1984 | Sakata et al. | 33/794 |
| 4,536,964 A | * | 8/1985 | Lazes | 33/199 R |
| D280,493 S | | 9/1985 | Johnson | D10/73 |
| 4,590,677 A | | 5/1986 | Kopp | 33/42 |
| 4,731,931 A | * | 3/1988 | Goodman et al. | 33/796 |
| 4,873,771 A | * | 10/1989 | Wust | 33/802 |
| 5,156,162 A | * | 10/1992 | Gerhardt | 600/594 |
| 5,651,184 A | * | 7/1997 | Tutty | 33/21.1 |
| 5,722,179 A | * | 3/1998 | Zanier | 33/811 |
| 5,901,458 A | * | 5/1999 | Andermo et al. | 33/810 |
| 5,915,806 A | * | 6/1999 | Levee | 33/42 |
| 6,484,411 B1 | * | 11/2002 | Nixon | 33/33 |

FOREIGN PATENT DOCUMENTS

| | | |
|---|---|---|
| JP | 09038874 A | 2/1997 |
| JP | 10044067 A | 2/1998 |

* cited by examiner

*Primary Examiner*—Diego Gutierrez
*Assistant Examiner*—Yaritza Guadalupe
(74) *Attorney, Agent, or Firm*—Kelly Bauersfeld Lowry & Kelley, LLP

(57) ABSTRACT

A measuring scriber including a base having a channel. A bar is slidably disposed within the base channel. A jaw is mounted on an end of the bar. A first scribe blade or needle extends from the base, and a second scribe blade or needle extends from the jaw. A pin extends from the jaw for measuring and marking a point on an object on which it is placed. An alignment block is attached to the base and has a straight outer surface for contacting a straight reference edge, and a curved outer surface for contacting a curved reference edge. Thus, a reference point or line can be simultaneously measured and marked in relation to any flat or raised reference edge.

20 Claims, 9 Drawing Sheets

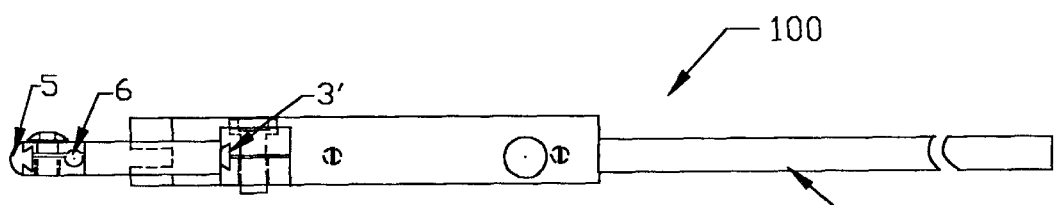
FIG. 4-A
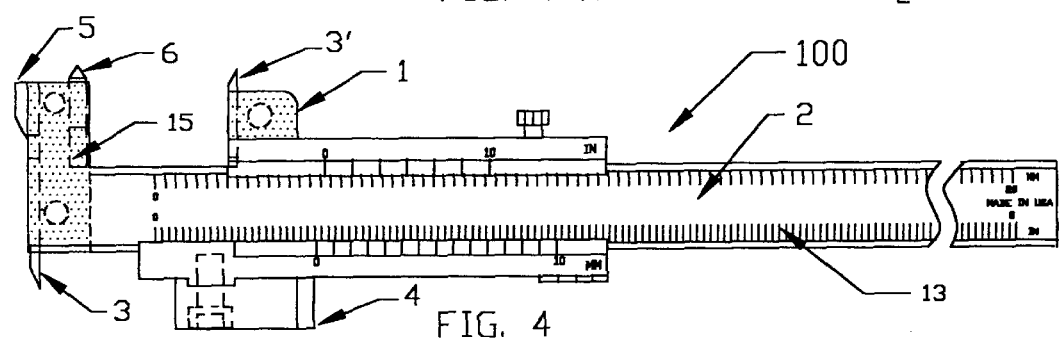
FIG. 4
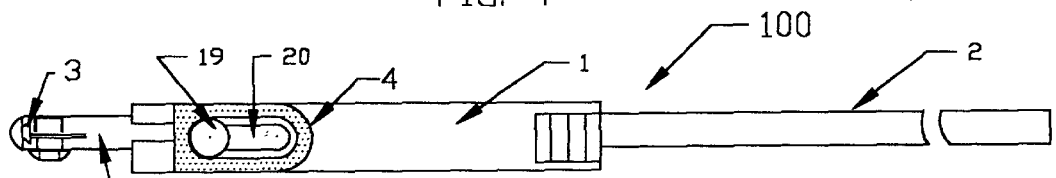
FIG. 4-B
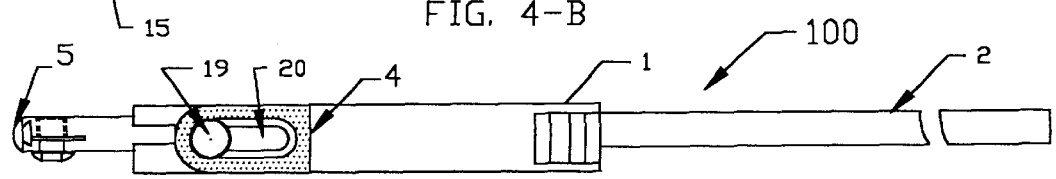
FIG. 4-C
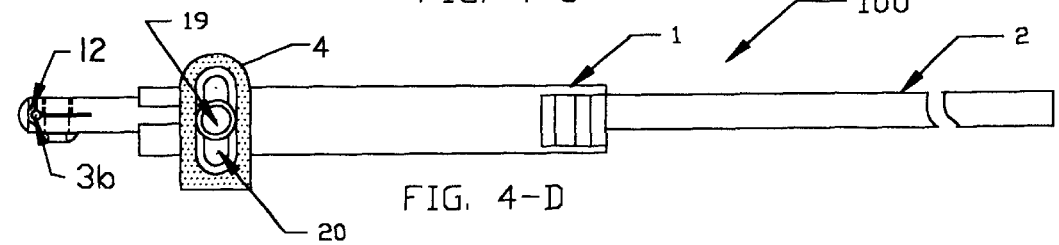
FIG. 4-D

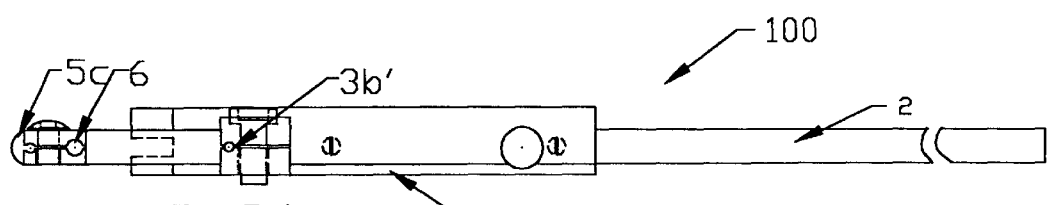
FIG. 5-A
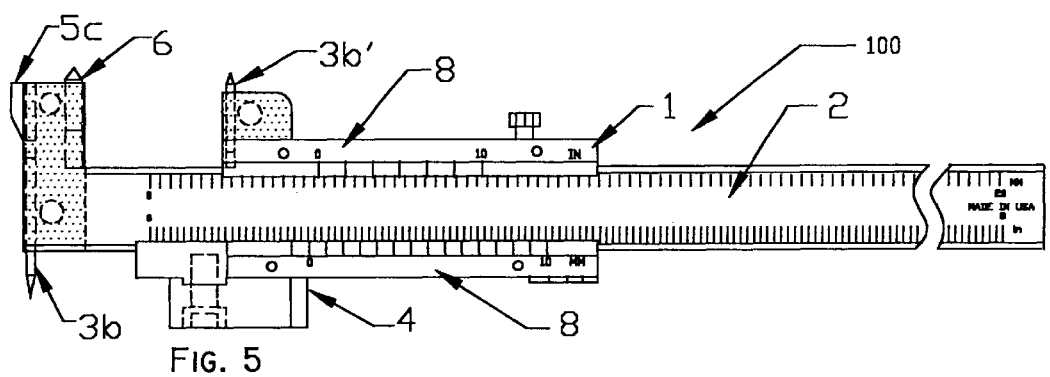
FIG. 5
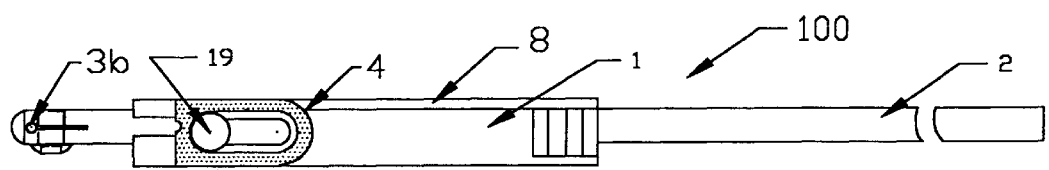
FIG. 5-B
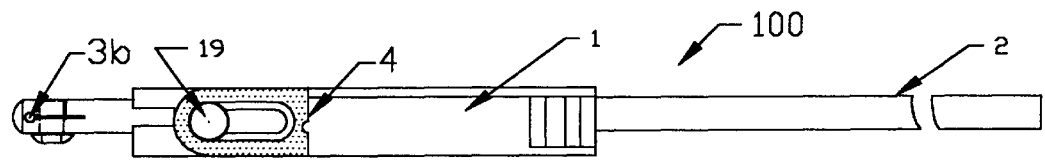
FIG. 5-C
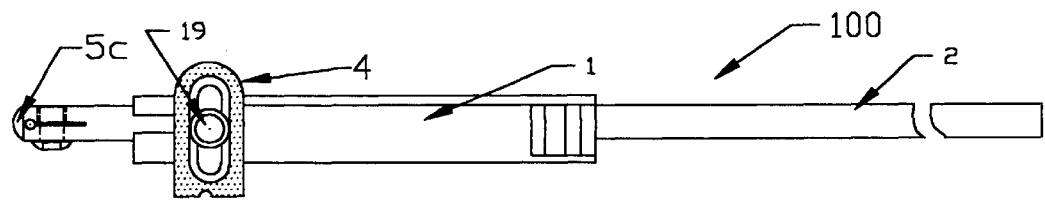
FIG. 5-D

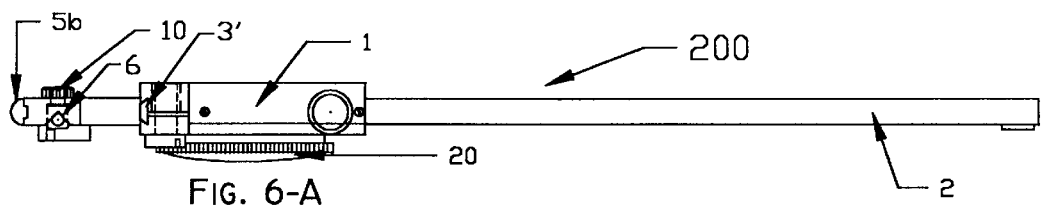
FIG. 6-A
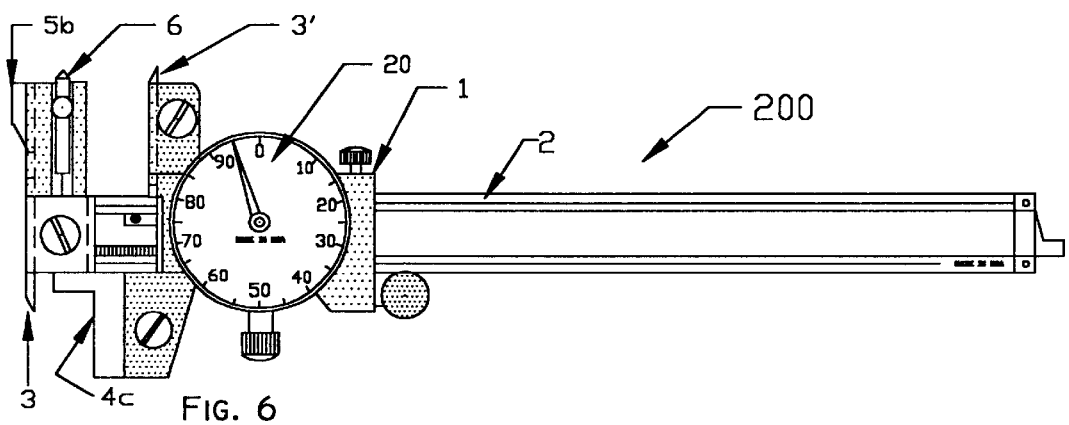
FIG. 6
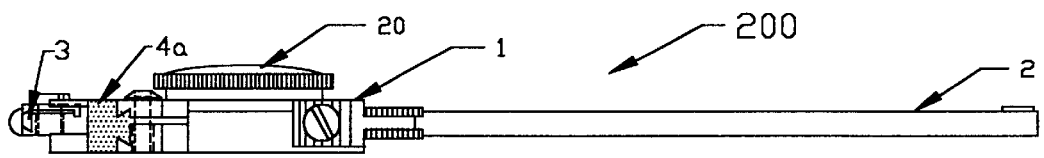
FIG. 6-B
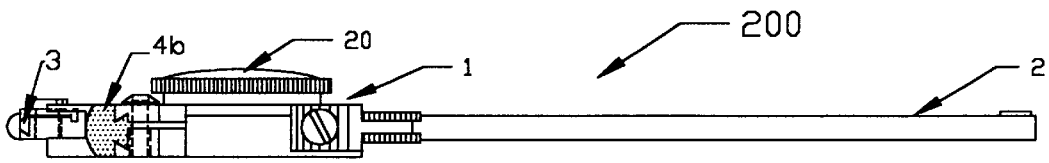
FIG. 6-C
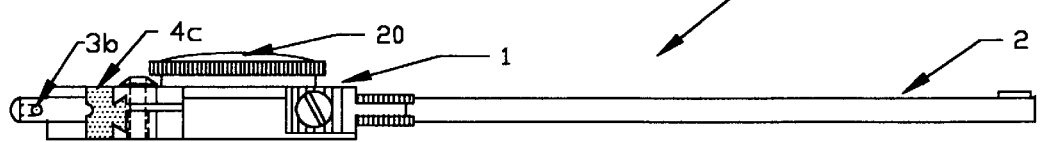
FIG. 6-D

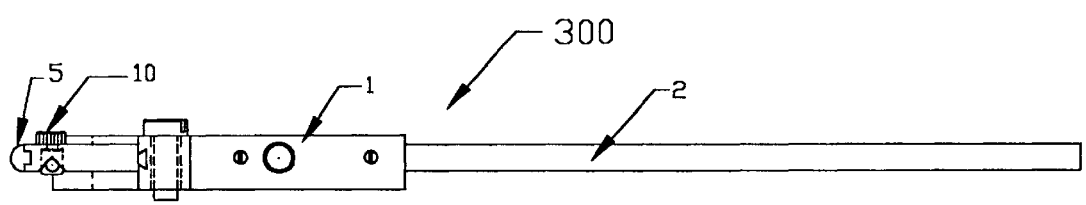
FIG. 7-A
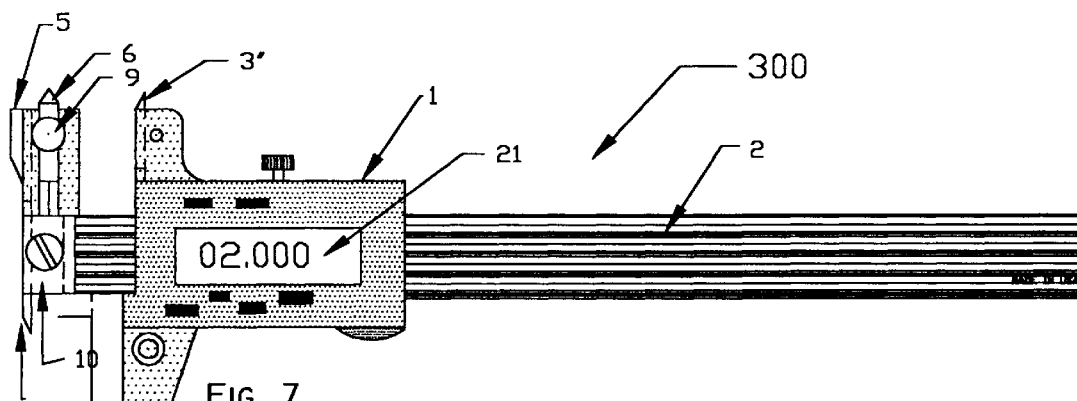
FIG. 7
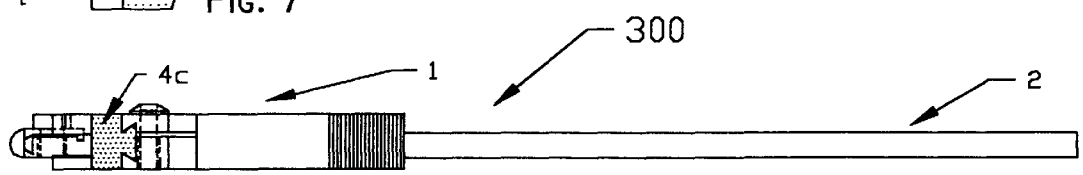
FIG. 7-B
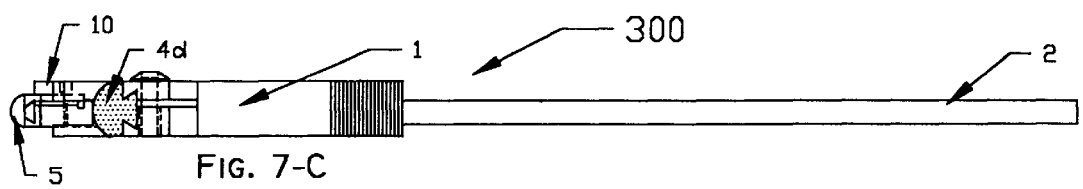
FIG. 7-C
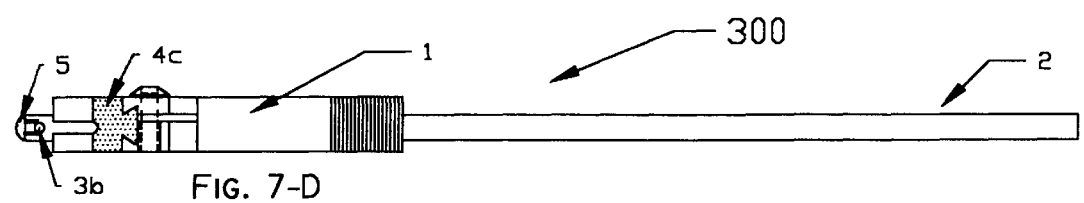
FIG. 7-D

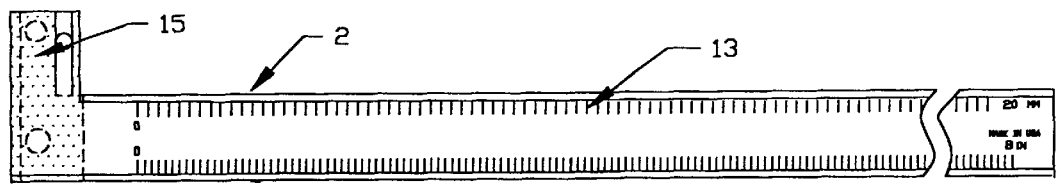
FIG. 8
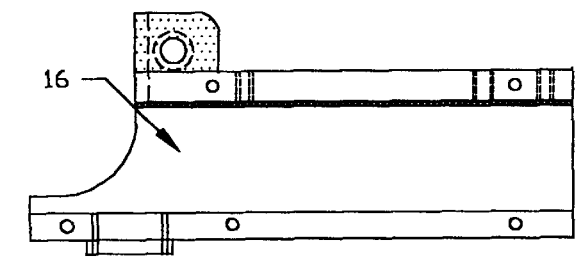
FIG. 9  FIG.9-A  FIG. 19-A  FIG. 19
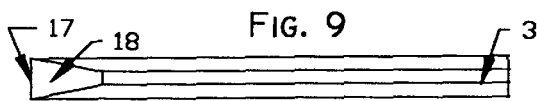
FIG. 10
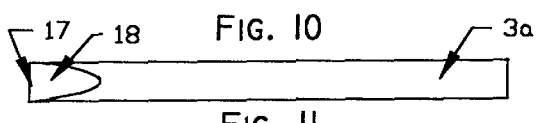
FIG. 11  FIG.19-B
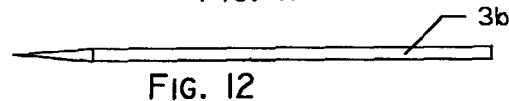
FIG. 12
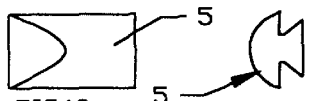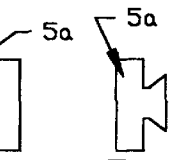
FIG.13  FIG.13-A  FIG. 14  FIG.14-A  FIG. 20
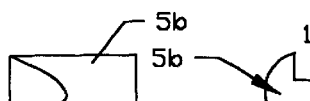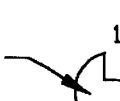
FIG. 15  FIG.15-A  FIG. 16  FIG.16-A  FIG. 21
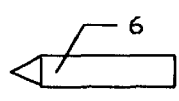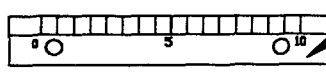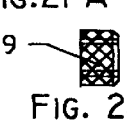
FIG. 17  FIG. 18  FIG. 22  FIG. 23

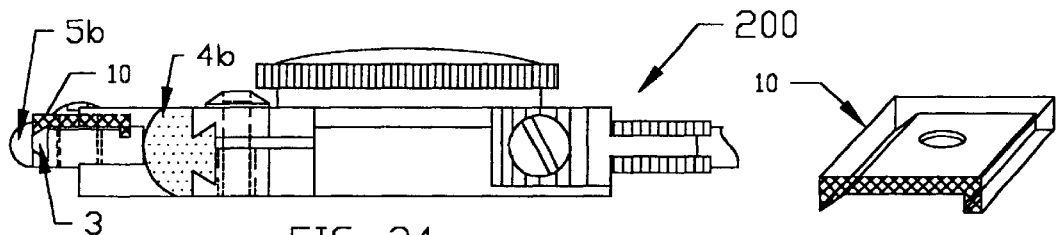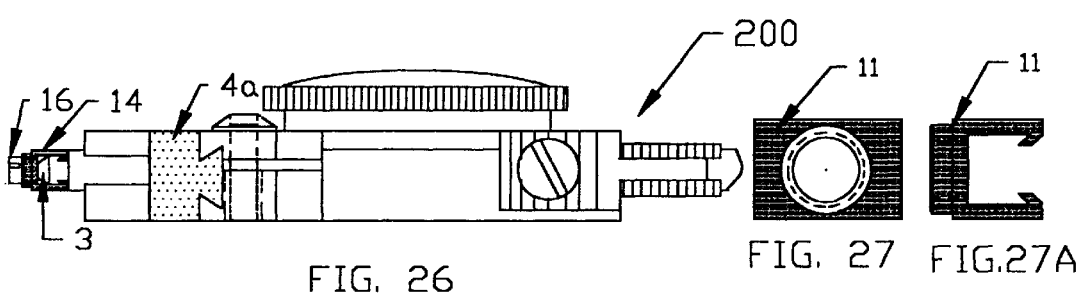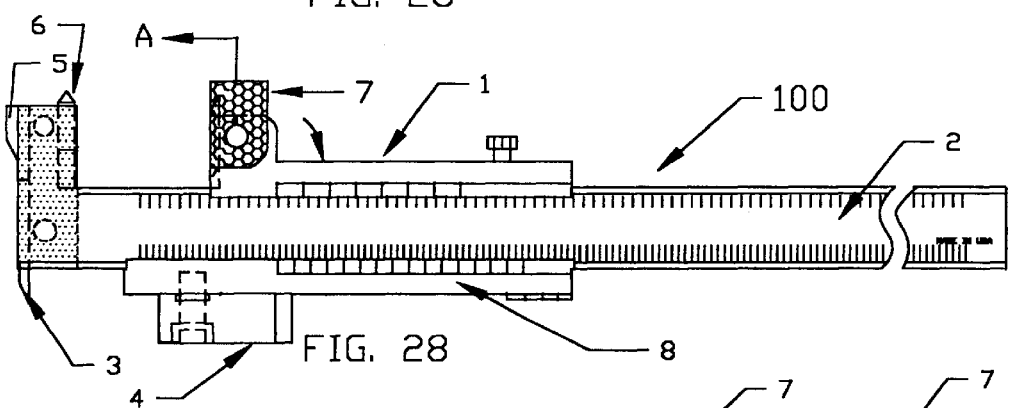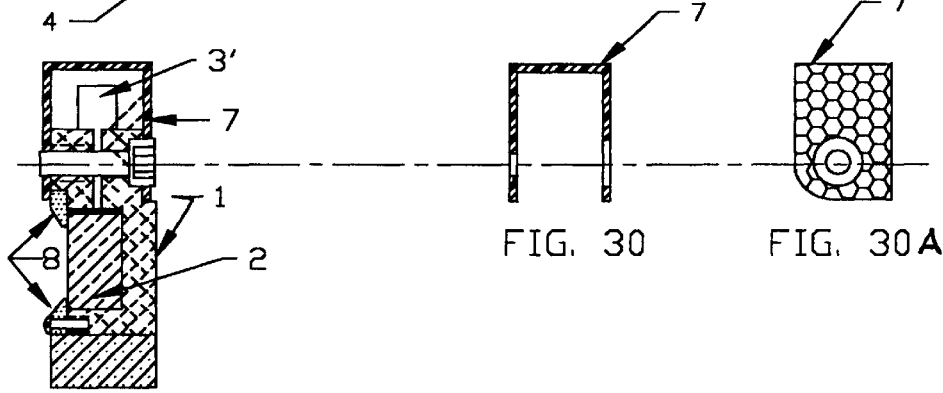

UNIVERSAL MEASURING SCRIBER

RELATED APPLICATION

This application is a continuation-in-part of U.S. application Ser. No. 09/430,884 filed Nov. 1, 1999 and abandoned Nov. 20, 1999.

BACKGROUND OF THE INVENTION

The present invention generally relates to scribers, markers, and calipers used mainly by tool, die and mold makers, machine operators, craftsmen, mechanics, technicians, etc. for marking, scribing, dividing, and transferring. More particularly, the present invention relates to a measuring scriber that allows a reference point or line to be simultaneously measured and marked in relation to a flat or raised reference edge which may be straight or curved.

Numerous tools and instruments have been used for measuring, marking, and scribing during woodwork, carpet and tile work, as well as machine work. Most of these instruments consist of an alignment block or point of some kind, a scribing blade or pin, and possibly a measuring device.

U.S. Pat. No. 4,590,677 issued on May 27, 1986 to Paul J. Kopp is an alignment gauge for scriber tool. It consists of a body with a scribing pin on one end and an adjustable alignment block. The scribing pin is secured with a screw. The pin requires a surface grinder and a special attachment for sharpening. The desired measurement is done with a separate device and errors are inherent. This device is unable to trace or mark a curved edge or a straight raised edge, draw a partial or full circle from a set point. It has no division capabilities. It appears to be uncomfortable to use, lacks a measuring device and most importantly it lacks consistency and accuracy.

U.S. Pat. No. 3,871,100 issued on Mar. 18, 1975 to William J. Hildebrandt discloses a marking gauge. It allows tracing of a straight edge only. Although it includes a measuring device, its accuracy is comparable to that of a regular ruler and does not allow precise measuring required in most machine work.

A variable width scriber, U.S. Pat. No. 3,805,391 issued to Roger D. Glasgow on Apr. 23, 1974, consists of a scribing pin placed eccentrically in a circle. It allows tracing away from an edge by setting the distance based on the circles contact point with the edge. It allows tracing a raised edge only at only several preset distances and has very poor measuring accuracy and consistency-even for woodworking jobs, where accuracy need not be high.

U.S. Pat. Des. No. 280,493, issued on Sep. 10, 1985 to Howard B. Johnson, is a scriber tool consisting of two arms attached at one end and with a scribing pin on the other end. It allows transferring a distance, measured by another device, to be marked from a point only. It can not trace an edge of any kind, nor does it have a measuring device.

Yet another device, U.S. Pat. No. 3,744,136 issued on Jul. 10, 1973 to John R. Henke, is an accessory for converting an ordinary pair of vernier or dial calipers into a vertical height measuring instrument. This device is an accessory, not a caliper, that can be converted to a scribing instrument, but it is limited to a fixed position on a flat surface and to vertical measurements and vertical gauge scribing.

Accordingly, there is a continuing need for a measuring scriber that allows one to measure and trace from a straight or curved edge, that may be raised. The measuring scriber should also have the ability to measure from a point. The present invention fulfills these needs, and provides other related advantages.

SUMMARY OF THE INVENTION

The present invention resides in a portable measuring and scribing instrument that can be used in a variety of positions, including vertical and horizontal positions, which includes of several end attachments adaptable to multiple surfaces, including straight surfaces, curved surfaces, raised surfaces, edges, and vertical and horizontal surfaces.

The measuring scriber instrument generally comprises a base having a channel. A first scribe blade or needle extends from the base. A bar is slidably disposed within the channel. The bar includes a jaw mounted on one end thereof, and a second scribe or needle extending from the jaw.

An alignment block is attached to the base, the alignment block having a straight or flat outer surface for contacting a straight reference edge, and a curved outer surface for contacting a curved reference edge. A measurement device is attached to the base so that a reference point or line can be simultaneously measured and marked in relation to a flat or raised reference edge.

Typically, a pin extends from the jaw generally parallel to the first scribe blade or needle for measuring and marking a point on a object on which it is placed. The measuring device may also include an alignment pad clamped onto the jaw.

The first and second scribe blades include a dominant straight edge bordered by at least one radial edge that can be ground to sharpen the scribe blade without altering the accuracy of the instrument. Preferably, the measuring scriber includes a removable cover disposed over either the first or second scribe blade or needle.

In one embodiment, parallel plates are attached to the base and overlying the channel for retaining the bar within the channel. The parallel plates include markings for measuring. Markings are also formed on an upper surface of the bar which cooperate with the parallel plate markings to form a vernier measuring device. In such embodiment, the alignment block may be movable between horizontal and vertical orientations relative to the bar. In alternate embodiments, the measuring device comprises a dial measuring device, or a digital measuring device attached to the base.

The universal measuring scribers of the present invention allow a user to trace from a straight or curved edge, or raised surface. Measurements can also be taken from a point. As the invention enables the measurement and marking simultaneously, the errors caused when using multiple instruments is eliminated.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 4 is a top plan view of the vernier measuring scriber similar to FIG. 1;

FIG. 4A is a partially sectioned side view of the measuring scriber of FIG. 1;

FIG. 4B is a side elevational view of FIG. 4, illustrating an alignment block in a generally horizontal position;

FIG. 4C is another side elevational view, similar to FIG. 4B;

FIG. 4D is a side elevational view of the measuring scriber of FIG. 4, illustrating the alignment block in a vertical orientation;

FIGS. 5–5D illustrate the vernier measuring scriber in views similar to FIGS. 4–4D, but having a round scribing needle instead of a scribing blade;

FIG. 6 is a top plan view of a dial measuring scriber, similar to FIG. 2;

FIG. 6A is a side elevational view of the measuring scriber of FIG. 6;

FIGS. 6B–6D are partially sectioned side elevational view of the measuring scriber of FIG. 6, illustrating various shaped alignment blocks incorporated therein;

FIG. 7 is a top plan view of a digital measuring scriber, similar to FIG. 3;

FIG. 7A is a partially sectioned side elevational view of the measuring scriber of FIG. 7;

FIGS. 7B–7D are partially sectioned side elevational views of the measuring scriber of FIG. 7, illustrating various alignment blocks incorporated therein;

FIG. 8 is a top view of a bar utilized in accordance with the present invention;

FIG. 9 is a top view of a base utilized in accordance with the present invention;

FIG. 9A is an end view of the base of FIG. 9, illustrating an open-faced channel thereof;

FIGS. 10–12 are top views of scribing blades and needles used in accordance with the present invention;

FIGS. 13 and 13A are top and end views of an alignment pad having a radial working surface for a vernier measuring scriber embodying the present invention;

FIGS. 14 and 14A are top and end views of another alignment pad having straight or flat working surfaces;

FIGS. 15 and 15A are top and end views of yet another alignment pad having a radial outer working surface, and a rectangular shank for dial and digital measuring scribers embodying the present invention;

FIGS. 16 and 16A are top and end view of an adapter plate for using a round needle scriber in accordance with the present invention;

FIG. 17 is a top view of a center pin used in accordance with the present invention;

FIG. 18 is a top view of a closing plate utilized in accordance with the present invention;

FIGS. 19–19B illustrate an alignment block utilized in a vernier measuring scriber embodying the present invention, and having flat and curved outer surfaces;

FIG. 20 is a cross-sectional view of an alignment block having a straight outer surface for dial and digital measuring scribers embodying the present invention;

FIG. 21 is a cross-sectional view of another alignment block having radial outer surfaces for dial and digital measuring scribers embodying the present invention;

FIG. 21A is an end view of the alignment block of FIG. 21;

FIGS. 22 and 23 are bolts used in accordance with the present invention;

FIG. 24 is a partially fragmented side elevational view of a dial measuring scriber having a clamp, illustrated in FIG. 25, holding an alignment pad thereto;

FIG. 26 is a fragmented side elevational view of another dial measuring scriber having another clamp, illustrated in FIGS. 27 and 27A, attaching another alignment block thereto;

FIG. 28 is a top view of a vernier measuring scriber embodying the present invention having a scriber protective casing, illustrated in FIGS. 30 and 30A, covering a scribing needle thereof;

FIG. 29 is a cross-sectional view taken generally along line A—A of FIG. 28;

DETAILED DESCRIPTION OF THE PREFERRED EMBODIMENT

Figure 1:
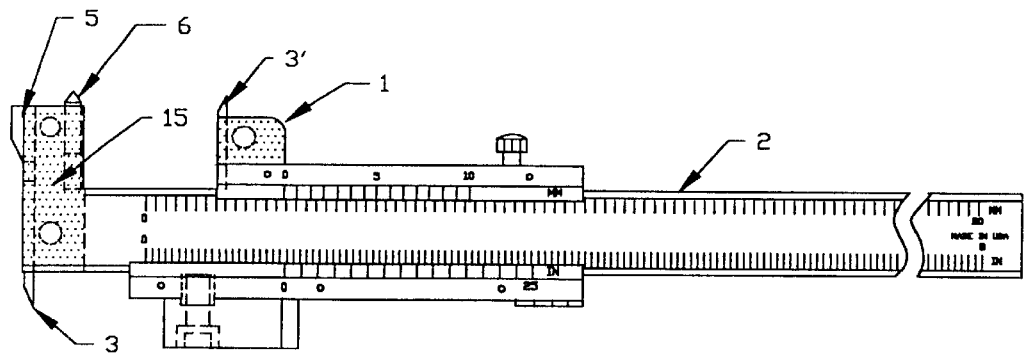
FIG. 1 is a partially fragmented top plan view of a measuring scriber embodying the present invention.
Figure 2:
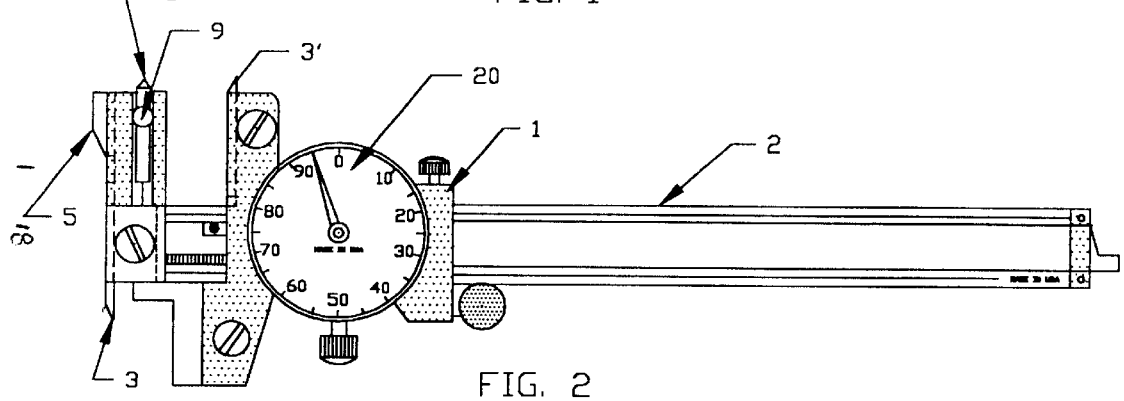
FIG. 2 is a top plan view of a dial measuring scriber embodying the present invention.
Figure 3:
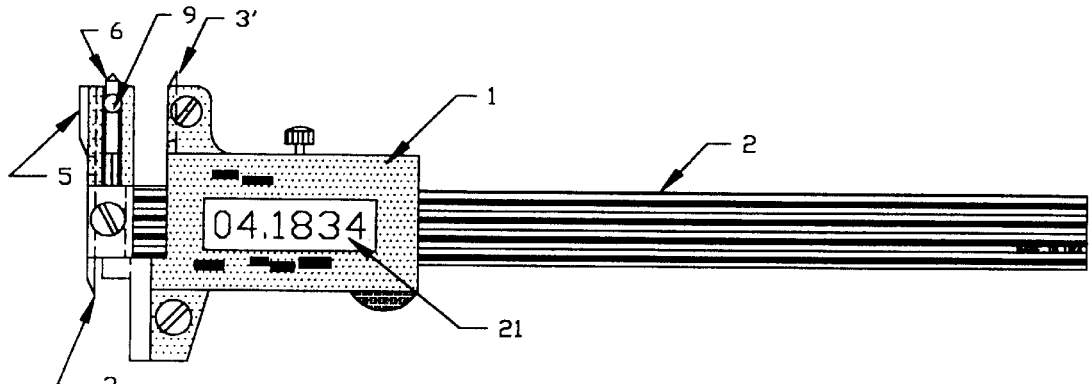
FIG. 3 is a top plan view of a digital measuring scriber embodying the present invention.
Figure 31:
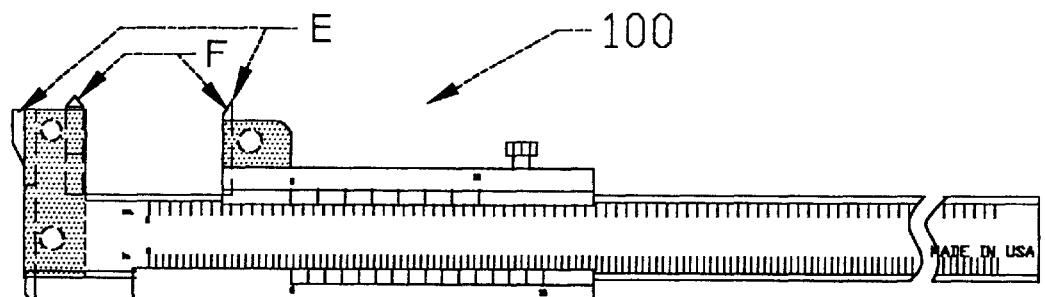
FIG. 31 is a top view of a vernier measuring scriber embodying the present invention.

As shown in the accompanying drawings for purposes of illustration, the present invention resides in a measuring scriber, generally referred to by the reference number 100 in FIGS. 1, 4–5D and 31–37; by the reference number 200 in FIGS. 2, 6–6D, 24, and 26; by the reference number 300 in FIGS. 3 and 7–7D. The measuring scribers 100–300 can be used by tool, die and mold makers, machine operators, craftsmen, mechanics, technicians, etc. for marking, scribing, dividing and transferring. Similar structural components between the various embodiments are labeled with the same or similar reference numbers.

With reference now to FIGS. 1 and 4–5D, a first particularly preferred measuring scriber 100 is illustrated. The measuring scriber 100 includes a base 1 having an open-faced channel 16, as shown in FIGS. 9 and 9A, through which a bar 2 having a jaw 15 attached at one end thereof, as shown in FIG. 8, slides therethrough. Plates 8 are attached to the base 1 so as to be disposed generally parallel to one another, and enclose the bar 2 within the channel 16. Markings 13 are formed on the bar 2, which cooperate and are read with markings 14 on the parallel plates 8 to form a vernier-type measuring scriber 100. The markings 13 and 14 can be in millimeters, thousandths of an inch, etc. to meet the needs of the user.

A scriber blade or needle 3 extends from the base 1. A second scriber blade or needle 3 extends generally opposite the first blade 3' from the jaw 15. A center pin 6 extends from an opposite side of the jaw 15 so as to be generally parallel to the first scriber blade or needle 3'. As will be more fully described herein, the scriber blades 3 and pin 6 are used to form reference markings and the like. As illustrated in FIGS. 10–12, such markings can be made with either a scriber blade 3 or 3A or a round needle 3B. The scriber blade 3 or 3A can be replaced with a round needle 3B utilizing a holder-profile plate 12, illustrated in FIGS. 16 and 16A, which holds the smaller round needle 3B in place.

Figure 36:
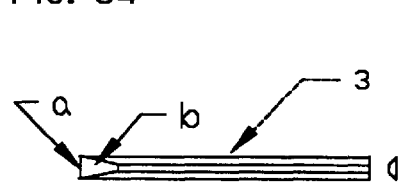
FIG. 36 is a top view of a particularly preferred scribing blade utilized in accordance with the present invention.

In order to retain the accuracy and consistency of the measurement markings, the blades 3 and 3A include a straight and flat blade end 17 having a semi-circular or beveled face 18 extending therefrom. It will be appreciated by one skilled in the art that such face 18 can be ground by a grinder to sharpen the edge 17 without altering the consistency and accuracy of the measuring scriber 100–300. Thus, as illustrated in FIG. 36, sharpening of the scribing blades 3 and 3' with a trapezoid, triangular or semi-circular grinding face can be performed on a regular grinder. The area 18 or B in FIG. 36, is ground down while the edge 17, marked A in FIG. 36, is kept constant. As a result, the accuracy of all marks made by the scribing blades 3 and 3' is kept after sharpening the blades 3 and 3' on a regular grinder. In contrast, for the needle scriber 3B, a surface grinder with a center round attachment is needed for sharpening in order to preserve the accuracy of the marks.

Alignment block 7 has four working side surfaces, at least one being straight or flat, and the other contoured, typically round or curved. The distance from the center of a tightening screw 19 to each working surface is intended to be exactly equal. This accuracy is assured by a tooth on the base 1 which slides in the grooves 20 of the alignment block 4. The outside surfaces of the alignment block 4 are intended to come into contact with a reference edge or surface to assist in measuring and marking using the measuring scriber 100, as will be described more fully herein. An alignment pad 5 is attached, via its shank, to the jaw 15 at the end of bar 2. The alignment pad 5 has either a straight or curved working surface, as illustrated in FIGS. 13–15A.

A center pin 6 is attached to the jaw 15, and oriented generally parallel to blade 3'. The pin is held in place by a holding bolt 9, illustrated in FIGS. 22 and 23, and can be adjustable in length. The center pin 6 is used to create measurement markings from a given point, as will be described more fully herein in relation to FIG. 37.

The alignment pad 5 can be adjustably held in place on the jaw 15 using a clamp 10 or 11, as illustrated in FIGS. 24–27A. Also, a protective cover 7 may be removably attached over either scribing blade or needle 3 to protect the marking edge thereof from deformation, and surrounding objects from puncture or scratch as illustrated in FIGS. 25–30A.

With reference now to FIGS. 2 and 6A–6D, a dial measuring device 20 may be attached to the base 1, and the bar 2 modified as necessary to cooperate with the dial 20 to produce accurate measurements. The remaining components described above are generally consistent with the first described embodiment. Thus, this embodiment 200 is utilized in generally the same fashion as the "vernier-type" measuring scriber 100, as will be more fully described herein.

Figure 38:
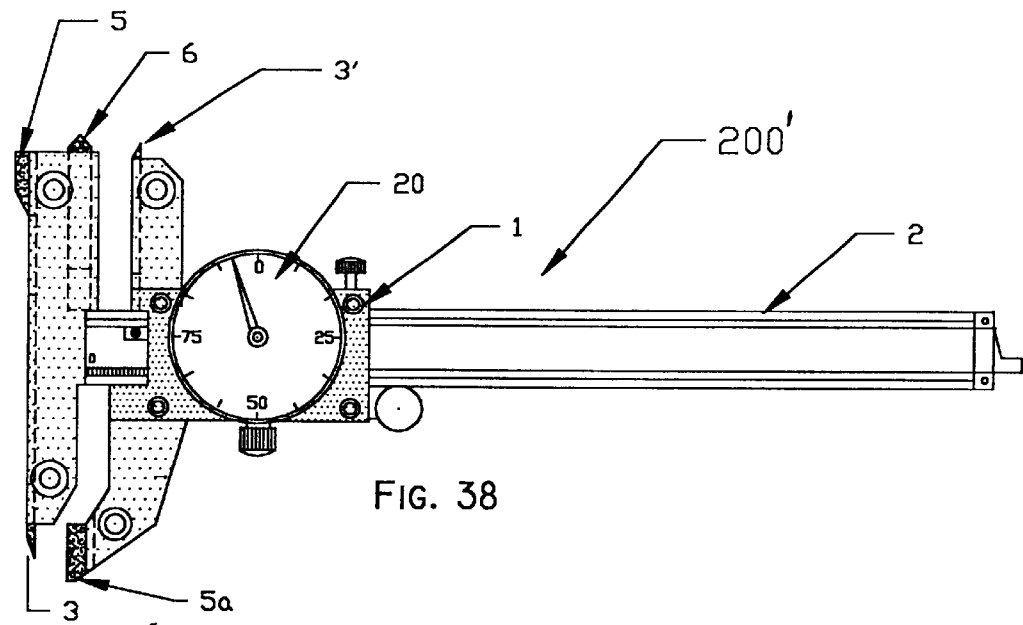
FIGS. 38–40 are top views of several dial measuring scriber embodiments having long jaws embodying the present invention.
Figure 39:
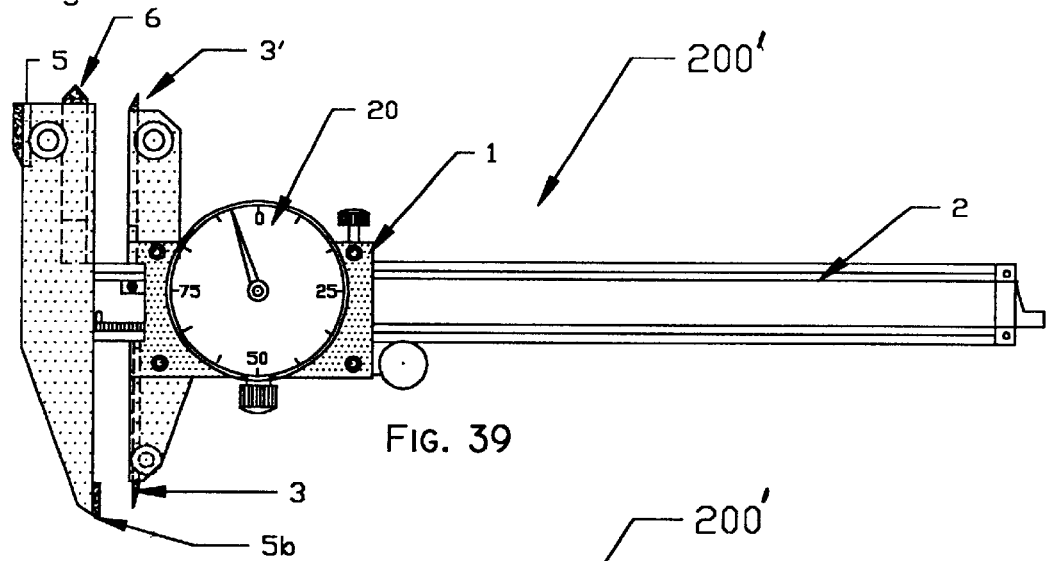
Figure 40:
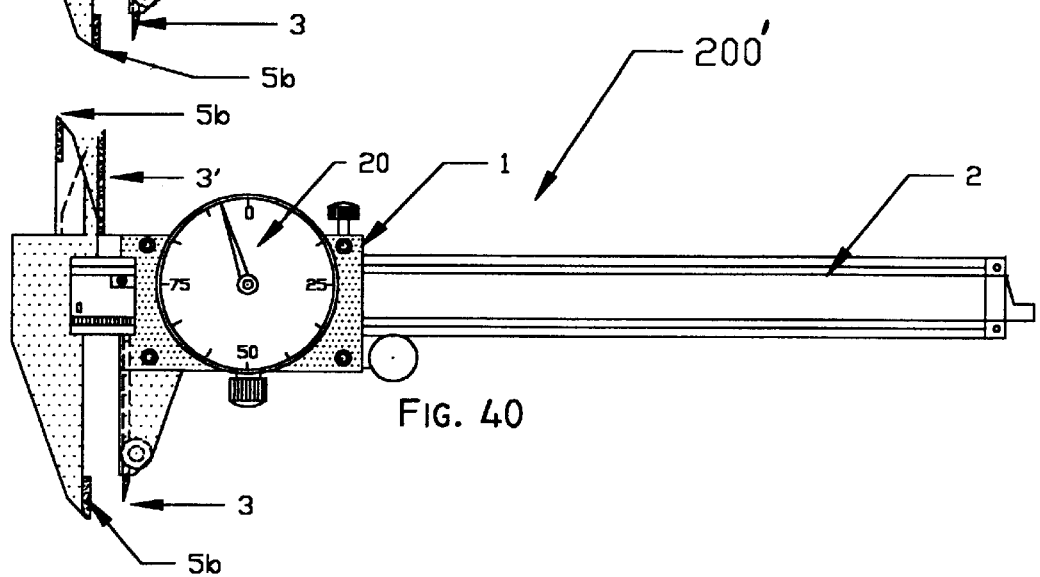

FIGS. 38–40 illustrate a dial measuring scriber 200' having elongated jaws which are used in the manner described above for measuring and marking, but on a larger scale.

Alternatively, the measuring device may comprise a digital measuring device 21, as are well known to one skilled in the art and generally illustrated in FIGS. 3, and 7–7D. Once again, the bar 2 may be modified as necessary to cooperate with the digital measuring device 21 to produce the correct results. Although at greater expense to manufacturer, such digital measuring device 21 can provide very accurate measurements which are easy to read, and can include different functions to measure in millimeters or inches.

Typically, the center pin 6 only includes a holder bolt 9 in the dial and digital measuring scribers 200 and 300. Also, clamps 10 and 11 which attach the alignment pad 5 to the bar jaw 15 are usually only incorporated into the dial and digital measuring scribers 200 and 300.

Figure 32:
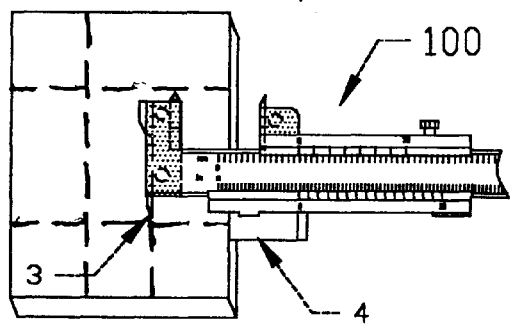
FIG. 32 is a perspective view of the measuring scriber of FIG. 31 measuring and marking reference lines utilizing components and area referred to by "D" of FIG. 31.
Figure 33:
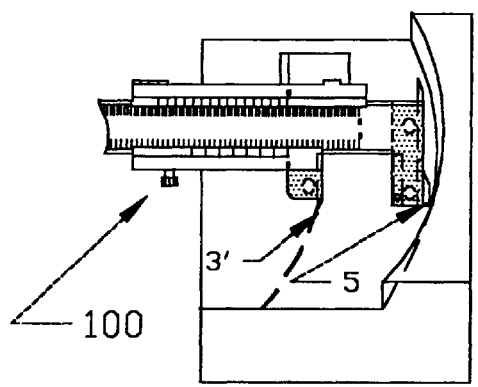
FIG. 33 is a perspective view of the measuring scriber of FIG. 31 measuring and marking along a raised curved surface, utilizing components and area "E" of FIG. 31.
Figure 34:
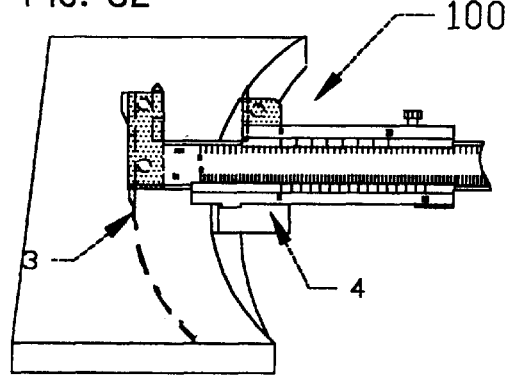
FIG. 34 is a perspective view of the measuring scriber of FIG. 31 measuring and marking an object utilizing the "D" area and components of FIG. 31.

With reference now to FIGS. 31–35, and 37, the manner of operation of the measuring scribers 100–300 will now be described. It will be noted by the reader that the "operating areas" D–F have been labeled on the illustrated "vernier" measuring scriber 100 to assist the reader in understanding the components which participate during each function. Operational area "D" involves the use of the scribing blade 3 and alignment block 4. As illustrated in FIG. 32, the alignment block 4 is placed adjacent to an edge of a flat surface and the desired distance, as measured by the measuring device or read with the markings 13 and 14 is marked using the scribing blade 3. If the edge of a flat surface is to be traced at a set distance, the alignment block 4 is slid along the reference surface edge, which can be straight, as illustrated in FIG. 32, or curved as illustrated in FIG. 34. Once again, the marking, or strike line, is made with the scribing blade 3 as the measuring scriber 100, and particularly the alignment block 4, is moved along the reference edge surface.

Figure 35:
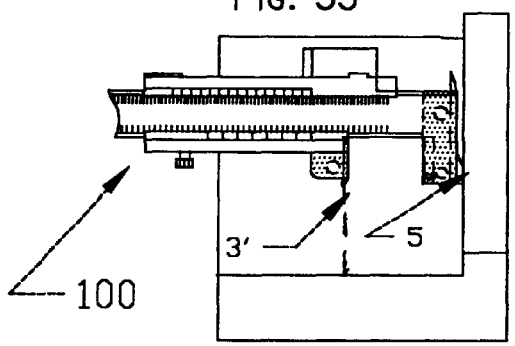
FIG. 35 is a perspective view of the measuring scriber of FIG. 32 measuring and marking a straight reference line in relation to a straight raised surface, utilizing the components and area designated "E" in FIG. 31.

Operational area "E" involves the use of the second scribing blade 3' extending from the base 1. As illustrated in FIGS. 33 and 35, the alignment pad 5 is placed in contact with a raised reference edge of a flat surface, and a mark is made with the scribing blade 3' at a measured, desired distance. It will be noted that a curved or straight raised edge can be traced at a desired distance by sliding the alignment pad 5 along generally perpendicular to the edge while scribing a marking line with the scribing blade 3' as shown. Of course, as appreciated by one skilled in the art, the desired measured distance is a distance between the alignment pad 5 and scribing blade 3'.

Figure 37:
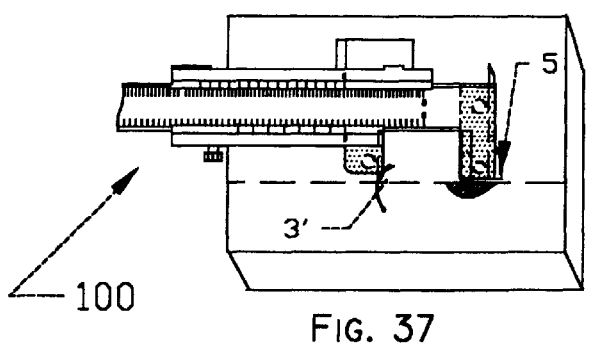
FIG. 37 is a perspective view of the measuring scriber of FIG. 31 measuring and marking a line utilizing the "F" components and area of FIG. 31.

Operational area "F" involves the use of the scribing blade 3' extending from the base 1 and the center pin 6, as illustrated in FIG. 37. With the center pin 6 at a desired and marked point, a measured distance can be marked from that point with the scribing blade 3' as shown. A full or partial circle can also be made with the center pin 6 being in the center of the desired circle. Multiple dividing marks can be made along either a straight or curved line using the above application as well. When setting the desired measurement to be marked, the distance between the center pin 6 and the scribing blade 3' of the measuring scriber 100, in the closed position, must be accounted for. This measurement is marked on the instrument.

Using the universal measuring scriber 100–300 of the present invention, it is clear that one can chose a desired distance with the precision of a caliper to a thousandth of an inch or tens of millimeters. Transfer of this measurement is not necessary, as the instrument of the present invention simultaneously measures and marks, eliminating any transfer errors and performing the task more quickly. Thus, increase speed and convenience are realized when measuring and marking distances, resulting in greater efficiency and productivity of work processes. The measuring scriber instrument of the present invention also has the capability of measuring and marking from a variety of different surfaces, such as a raised or a dropped, a straight or a curved edge, as well as a point on a flat surface. It can mark a desired point or trace an edge at a chosen distance. All of these functions are frequently needed during machine work, tool or die making, crafts working, etc. The universal measuring scriber of the present invention has the ability to perform all of these functions with precision and ease utilizing a hand-held and portable instrument as described above.

The design of the scribing blades 3 allows sharpening on a regular grinder without comprising the high accuracy of this instrument. This not only improves the efficiency and ease of use, but also eliminates the need for a surface grinder with a rotating attachment. Also, the design of the scriber blades 3 insures consistent accuracy of the scribing blade edge.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A measuring scriber, comprising:
    a base having a channel, a first scribe blade or needle extending from the base, and a measurement device attached to the base;
    a bar slidably disposed within the channel, a jaw mounted on an end of the bar, and a second scribe blade or needle extending from the jaw; and
    an alignment block attached to the base, the alignment block having a straight outer surface for contacting a straight reference edge, and a curved outer surface for contacting a curved reference edge;
    whereby a reference point or line is simultaneously measured and marked in relation to a flat or raised reference edge.

2. The measuring scriber of claim 1, including a pin extending from the jaw for measuring and marking a point on an object on which it is placed.

3. The measurement scriber of claim 2, wherein the pin extends generally parallel to the first scribe blade or needle.

4. The measuring scriber of claim 1, including parallel plates attached to the base and overlying the channel for retaining the bar within the channel.

5. The measuring scriber of claim 4, wherein the parallel plates include markings for measuring.

6. The measuring scriber of claim 5, wherein the measurement device comprises markings formed on an upper surface of the bar which cooperate with the parallel plates markings to form a vernier measuring device.

7. The measuring marking scriber of claim 6, wherein the alignment block is movable between horizontal and vertical orientations relative to the bar.

8. The measuring scriber of claim 1, wherein the measuring device comprises a dial measuring device.

9. The measuring scriber of claim 1, wherein the measuring device comprises a digital measuring device.

10. The measuring scriber of claim 1, including an alignment pad clamped onto an end of the jaw.

11. The measuring scriber of claim 1, including a removable cover disposed over either the first or second scribe blade or needle.

12. The measuring scriber of claim 1, wherein the first and second scribe blades include a dominant straight edge bordered by at least one radial edge that is ground to sharpen the scribe blade.

13. A measuring scriber, comprising:
    a base having a channel, a first scribe blade or needle extending from the base, and a measurement device attached to the base;
    a bar slidably disposed within the channel, a jaw mounted on an end of the bar, a second scribe blade or needle extending from the jaw, and a pin extending from the jaw generally parallel to the first scribe blade or needle for measuring and marking a point on an object on which it is placed;
    an alignment pad clamped onto an end of the jaw; and
    an alignment block attached to the base, the alignment block having a straight outer surface for contacting a straight reference edge, and a curved outer surface for contacting a curved reference edge;
    whereby a reference point or line is simultaneously measured and marked in relation to a flat or raised reference edge.

14. The measuring scriber of claim 13, including parallel plates attached to the base and overlying the channel for retaining the bar within the channel, the plates including markings thereon for measuring.

15. The measuring scriber of claim 14, wherein the measurement device comprises markings formed on an upper surface which cooperate with the parallel plates markings to form a vernier measuring device.

16. The measuring marking scriber of claim 15, wherein the alignment block is movable between horizontal and vertical orientations relative to the bar.

17. The measuring scriber of claim 13, wherein the measuring device comprises a dial measuring device.

18. The measuring scriber of claim 13, wherein the measuring device comprises a digital measuring device.

19. The measuring scriber of claim 13, including a removable cover disposed over either the first or second scribe blade or needle.

20. The measuring scriber of claim 13, wherein the first and second scribe blades include a dominant straight edge bordered by at least one radial edge that is ground to sharpen the scribe blade.

* * * * *